G. MARSHALL.
MACHINE FOR MAKING SHOCKS.
APPLICATION FILED NOV. 21, 1911.
1,025,705.
Patented May 7, 1912.
3 SHEETS—SHEET 3.
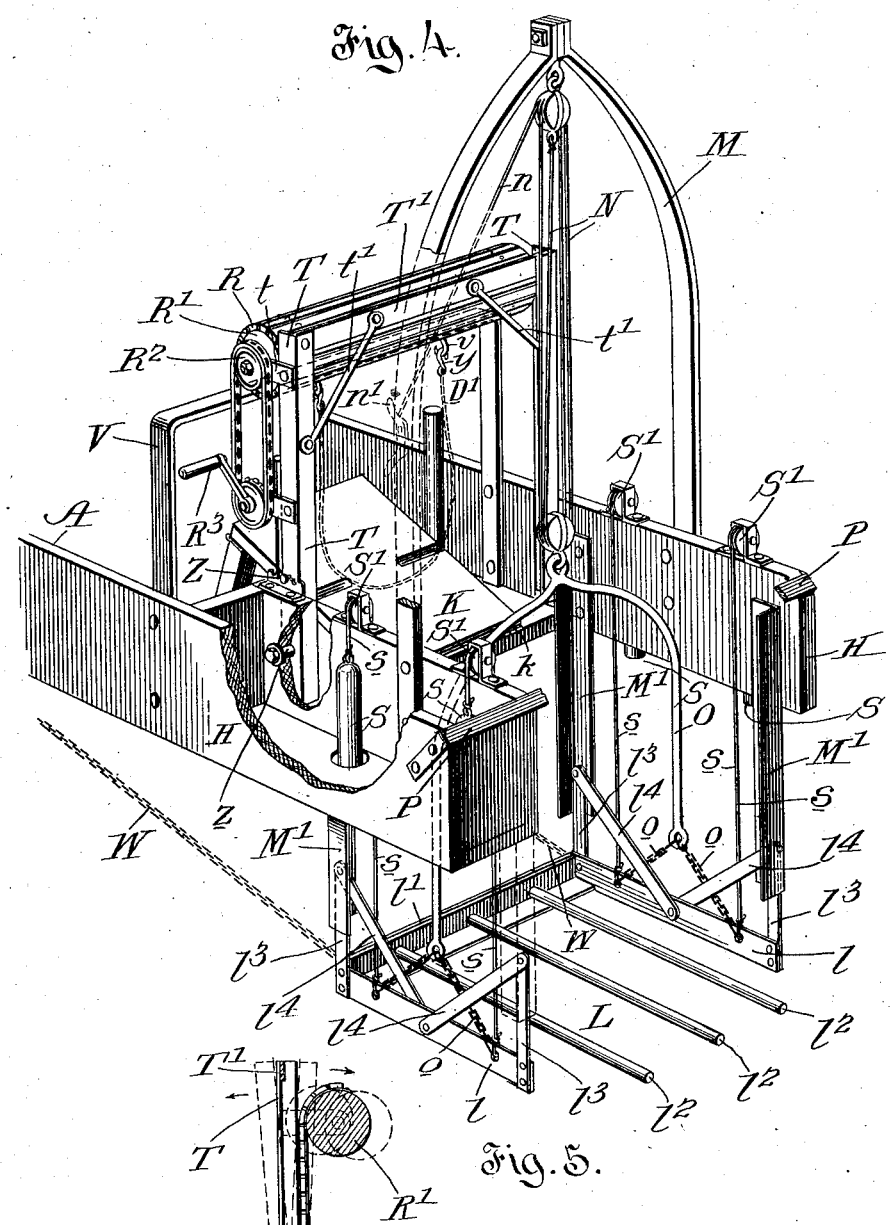
Fig. 4.
Fig. 5.
Witnesses
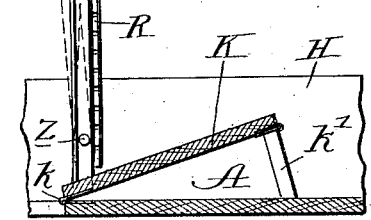
Inventor
George Marshall
By Baldwin Wight
his Attorneys

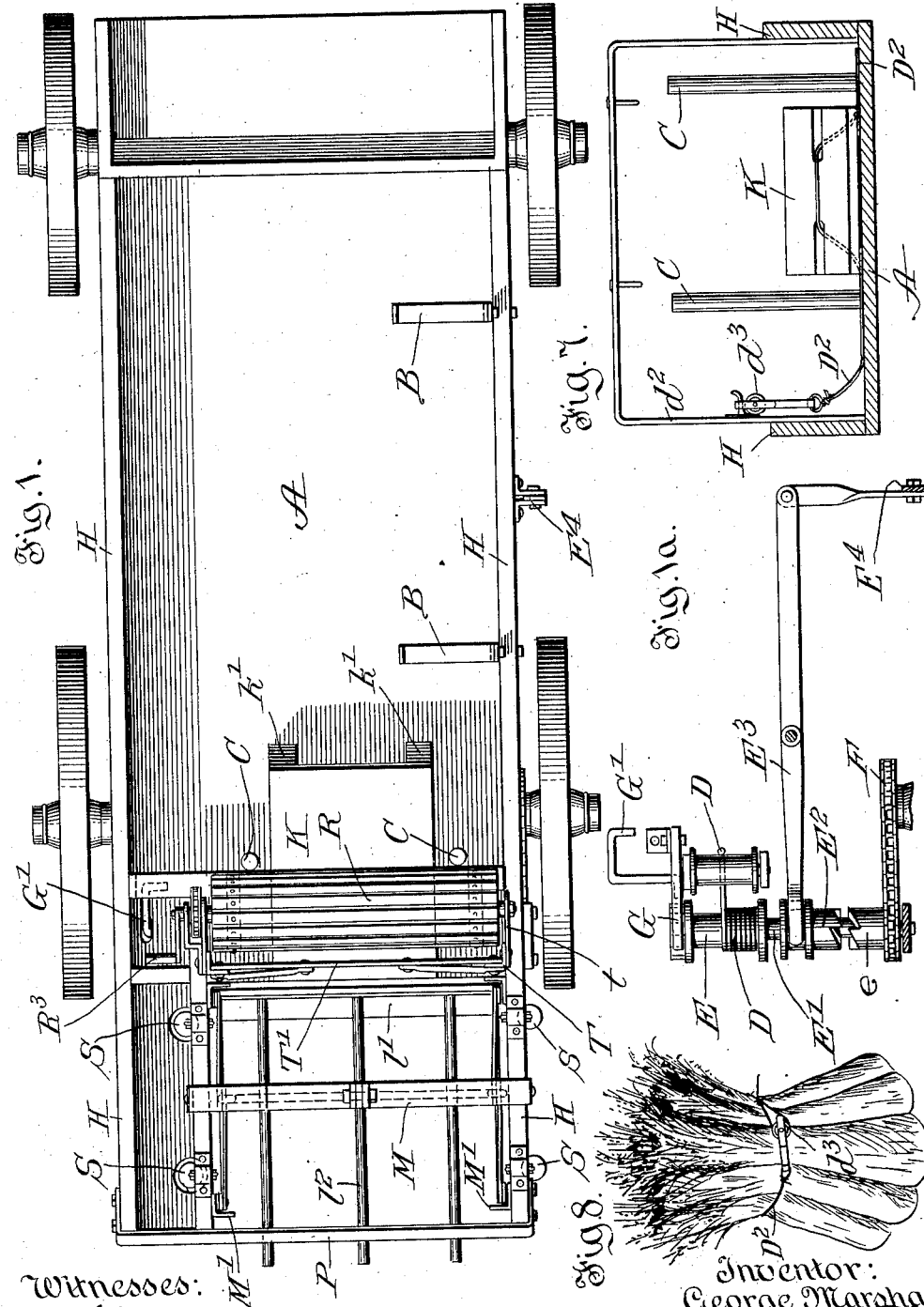

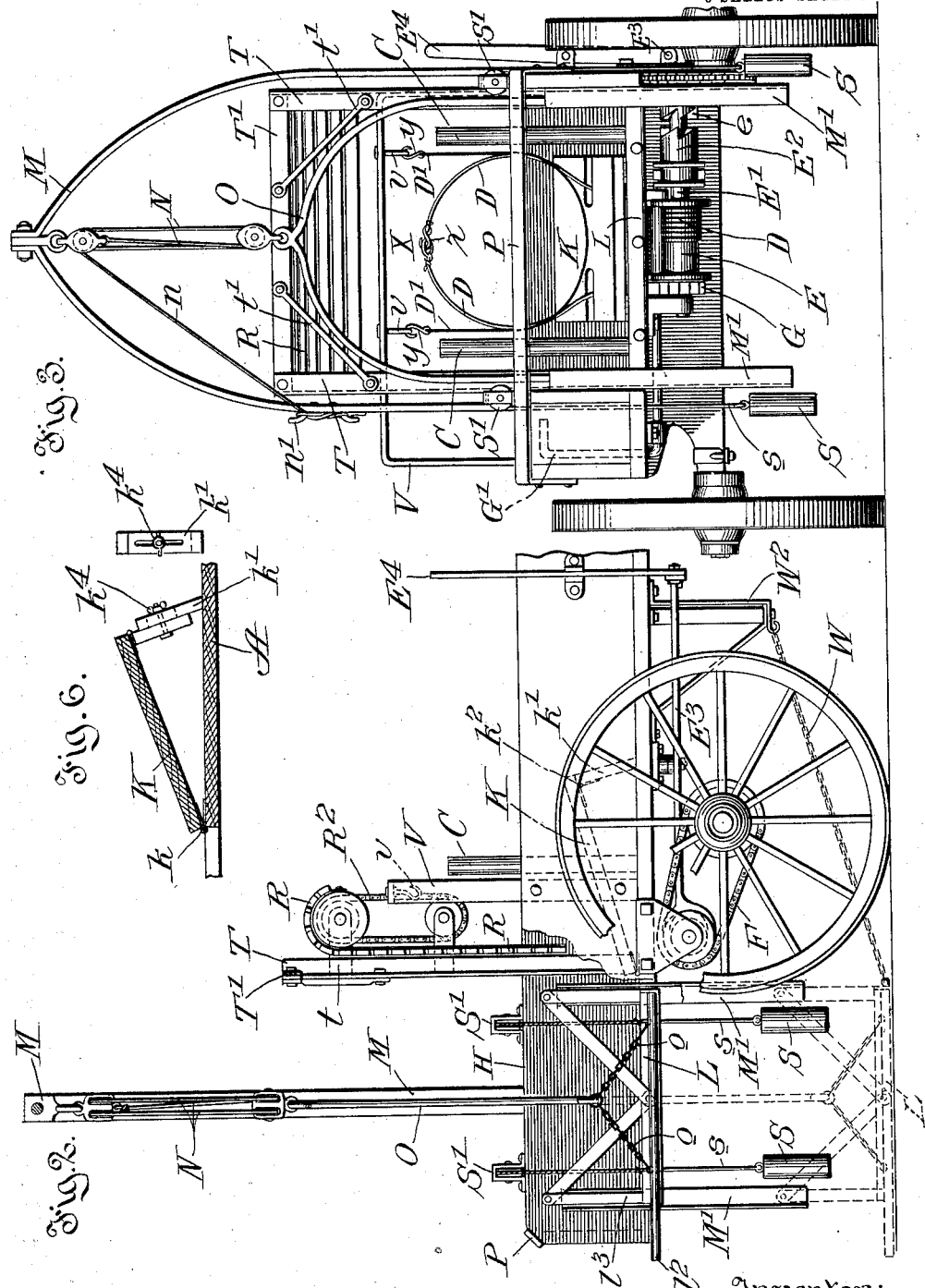

UNITED STATES PATENT OFFICE.

GEORGE MARSHALL, OF FREMONT, NEBRASKA.

MACHINE FOR MAKING SHOCKS.

1,025,705.   Specification of Letters Patent.   Patented May 7, 1912.

Application filed November 21, 1911. Serial No. 661,575.

*To all whom it may concern:*

Be it known that I, GEORGE MARSHALL, a citizen of the United States, residing in Fremont, in the county of Dodge and State of Nebraska, have invented certain new and useful Improvements in Machines for Making Shocks, of which the following is a specification.

My invention relates to machines of the kind shown in my U. S. Patents No. 937,454 of October 19, 1909 and No. 1,000,533 of August 15, 1911, in which a wagon which travels abreast of the binder receives the sheaves from an elevator which connects the binder with the wagon. The wagon is provided with a compressing rope which, when a suitable number of sheaves are assembled, is placed around them and tightened so as to firmly draw them together. When in this condition another rope is employed to bind the sheaves together and the compressing rope is released. The shock is then turned into an upright position, cap sheaves are applied and in the machine shown in my later patent the shock is moved on to a frame suspended at the rear end of the wagon by block and tackle so that the shock-lowering frame may be raised and lowered when desired. In my Patent No. 1,000,533, the shock-lowering frame, when lowered, was free to swing in various directions and it was connected by chains to the front portion of the wagon whereby it was dragged over the ground.

According to my present invention, I provide rigid guides for the shock-lowering frame whereby it is held against movement except in a vertical direction, and I have added an apron against which the bases or butt ends of the sheaves are placed during the formation of the shock. This apron is adjusted so as to give the desired inclination to the base of the shock to correspond with the inclination of the ground on which the shock is dropped. The apron can be raised and lowered, being raised when the shock is moved from the wagon to the shock-lowering platform. When the sheaves are being piled at the rear end of the wagon their lower or butt ends rest on a platform hinged to the bottom of the wagon and this platform is made adjustable, by which means the base of the shock may be given the desired inclination to correspond with the ground level on which the shocks are dropped. This adjustable platform may be used alone for this purpose or may be used in connection with adjusting devices for the apron hereinbefore referred to.

Other features of my invention will be hereinafter described.

In the accompanying drawings:—Figure 1 is a top plan view of a shock making machine constructed in accordance with my invention. Fig. 1ª is a detail view of part of the mechanism for operating the compressing rope. Fig. 2 is a view partly in side elevation and partly in section of the rear portion of the machine showing by dotted lines the shock-lowering platform in its lowered position. Fig. 3 shows a rear elevation of the machine. Fig. 4 is a perspective view of the rear part of the machine, with some of the parts broken away. Fig. 5 is a detail view in section, showing the manner of adjusting the apron to give to the base of the shock the desired inclination. Fig. 6 is a detail view, showing the adjustable platform on which the sheaves rest during the formation of the shock. Fig. 7 shows a rope with a pulley attached which may be used to bind the shock after it has been compressed. Fig. 8 is a perspective view of a shock with the binding rope thereon.

The wagon A is of substantially the same construction as that shown in my beforementioned patents, and the sheaves as they come from the binder or from the elevator are delivered on to the bottom of the wagon. The sheaves are placed between upright posts C, like those shown in my patents, and when a sufficient number of sheaves have been placed between the posts they are compressed by the rope D which is attached at one end to the wagon body and at its opposite end is connected to a windlass or drum E on a shaft E' carrying clutch mechanism E², operated by the lever mechanism E³ and the handle E⁴, all such mechanism being similar to that heretofore employed. The clutch member $e$ which is loose on the shaft E' is connected by sprocket gearing F to one of the hind wheels of the wagon. Detent mechanism G, similar to that heretofore employed, is operated by the handle G'. The rope D may be divided, as shown at X (Fig. 3), being provided with a detachable connection for the ends, as indicated at $x$. In this way when the connection at X is separating the rope may be placed around a bundle of sheaves, then the ends of the rope may be connected together and the windlass operated to draw the rope taut around the bundle. When the clutch members are connected the wagon is driven forward and the rope D compresses the shock which is then bound with a rope D'. After this the compressing rope is withdrawn from the shock, being disconnected at X. The shock is turned to an upright position and the cap sheaves are applied. This forms a shock ready to be deposited in the field.

B indicates holders for the ropes for tying the shocks and cap sheaves.

Instead of using the rope D' shown in Fig. 3, I may employ the rope $D^2$ shown in Fig. 7. This rope is attached to a frame $d^2$ carrying a pulley $d^3$ over which the rope may be drawn when it is being applied to the shock after the latter has been operated upon by the compressing rope D.

The bottom of the wagon at the rear portion thereof is cut away between the sides H to form an opening in which is arranged the shock-lowering frame L, comprising two parallel side bars $l$, a front cross bar $l'$ and parallel rods $l^2$ which are attached to the front cross bar $l'$ and project rearwardly therefrom. The shock-lowering frame L is suspended from a U-shaped frame M by means of block and tackle N of any suitable construction. The rope $n$ may have its free end attached to a cleat $n'$ on one side of the frame M and the block and tackle is connected with a bail O attached to the shock-lowering frame by means of chains $o$. By means of the rope $n$ the shock-lowering frame may be raised and lowered. In order to prevent the shock from falling backward from the shock-lowering frame out of the wagon, I provide a guard P attached to the side of the wagon and extending across the rear portion thereof from one side of the wagon to the other. In order to counterbalance the weight of the shock-lowering frame, I provide weights S connected to cords or chains $s$, passing over pulleys S' on the wagon frame and attached to the side bars of the shock-lowering frame. Preferably two weights and cords or chains are applied to each side bar so that the front and rear portions of the frame are counterbalanced. At each corner of the shock-lowering frame there is an upright bar $l^3$. Each bar is rigidly secured to the frame and the upper ends of these bars are connected with diagonally arranged brace bars $l^4$ which stiffen the frame. The frame is guided vertically by vertically arranged angle bars M' which are securely fastened to the rearwardly projecting sides of the wagon body and are so disposed that they guide the frame L as the latter is raised and lowered and prevent it from moving sidewise or back and forth.

When a shock is placed on the frame L the rope $n$ is detached from the cleat $n'$ and let out so that the shock-lowering frame will be lowered in the manner indicated in Fig. 2 and also in Fig. 4, and then the shock is deposited on the ground and the wagon is driven away from it so as to leave it standing. After the shock has been thus withdrawn, the rope $n$ may be operated to lift the frame to its elevated position ready to receive another shock.

W, W indicate chains attached to the front end of the shock-lowering frame and extending under the wagon being connected at their front ends to brackets $W^2$ depending from the wagon body. When the shock-lowering frame is in its lowered position and the wagon is drawn forward the chains W draw forward the frame L, leaving the shock on the ground.

Experience in the practical operation of the machine shown in my previous patents has shown that it is important that the bases of the shocks should be given a proper inclination to correspond with the inclination of the ground on which the shock is deposited. When the machine is going up-hill the base should be given an appropriate inclination; when going down-hill the inclination should be in an opposite direction. I have provided novel devices by which this may be accomplished. K indicates a platform, which is hinged at $k$ to the bottom of the wagon body near the rear end thereof. This platform may be held in an inclined position by means of feet $k'$ hinged to the platform at $k^2$, as indicated in Fig. 2. These feet may be made in two or more parts, as indicated in Fig. 6, said parts being adjustably connected with each other at $k^4$, as shown in Fig. 6, so that any desired inclination may be given to this platform. In this way the desired inclination may be given to the shock.

I also provide at the rear end of the machine an apron R. This apron is preferably of the slatted type, its upper end being attached to a roller R', connected by sprocket gearing $R^2$ with crank mechanism $R^3$. By this means the apron may be raised and lowered. The roller R' is supported on arms $t$ projecting laterally from upright angle bars T attached to the wagon body and so arranged as to guide the apron while it is being raised and lowered and to support it against the pressure exerted by the sheaves when the latter are moved rearwardly. The angle bars T are connected at the top by a cross bar T', and the frame thus constructed may be braced by diagonally arranged rods $t'$. The angle bars T may be rigidly secured to the sides of the wagon body or they may be pivotally connected therewith, in the manner indicated in Fig. 5, so that the apron may be given an inclination in order that the base of the shock may be correspondingly inclined. In this way the base of the shock may be made to conform to the inclination of the ground on which the shock is deposited. When the apron is adjusted in this way the platform K need not be adjusted in the manner hereinbefore described but it is sometimes convenient to adjust both the platform and the apron. When the frame of the apron is made adjustable in the manner before described the angle bars T are preferably pivoted to the wagon body in the manner indicated at z in Figs. 4 and 5, and when this construction is used ratchet mechanism Z of any suitable kind may be used to hold the apron frame firmly in place when once adjusted to the desired position.

V indicates a frame arranged just in front of the apron which is provided with hooks v which I find to be quite convenient for holding the hooked ends y of the binding rope D′ while the shock is being formed. After the shock is formed the hooks y may be easily detached from the hooks v and the rope applied to the shock. The hooks v may be also used to hold the ends x of the rope D when the latter is not surrounding the shock. When the shock is being formed the butt ends of the sheaves are arranged below the top of the frame V and this frame surrounds the completed shock.

I claim as my invention:—

1. A machine for forming shocks, comprising a wagon body carrying means for compressing sheaves and forming them into a shock, a vertically movable shock-lowering frame at the rear of the wagon, comprising outer frame bars, interposed shock-supporting rods and vertical bars at each corner of the frame, vertical guides depending from the wagon body in which said vertical bars move, a frame rising from the wagon body above the shock-lowering frame, block-and-tackle mechanism carried by said last mentioned frame and connected with the shock-lowering frame for raising and lowering the latter, means for counterbalancing the weight of the shock-lowering frame and draft connections between the shock-lowering frame and the wagon body.

2. A machine for forming shocks, comprising a wagon body, vertical posts rising from the wagon body between which the sheaves are arranged to form the shock, an apron arranged in rear of the posts, means for raising and lowering the apron, a platform between the posts on which the butt ends of the sheaves are arranged to lie while the shock is being formed, means for adjusting the inclination of the platform, and a compressing rope passing around the platform.

3. A machine for forming shocks, comprising a wagon body, a compressing rope at the tail end of the wagon body, means for operating the compressing rope, a vertically arranged apron at the rear end of the wagon against which the butt ends of the sheaves rest during the formation of the shock and which rises above the top of the sides of the wagon, and means for raising and lowering this apron.

4. A machine for forming shocks, comprising a wagon body, means at the tail end of the wagon body for compressing sheaves and forming them into a shock, an apron at the rear end of the wagon against which the butt ends of the sheaves rest during the formation of the shock, a vertically arranged frame supporting said apron and which rises above the top of the sides of the wagon, and means for giving to said frame an inclination relatively to the wagon body either forward or rearward, for the purpose specified.

5. A machine for forming shocks, comprising a wagon body, posts rising vertically from the wagon body between which the sheaves are laid to form a shock, a platform between the posts on which the butt ends of the sheaves are arranged to lie while the shock is being formed, means for adjusting the inclination of the platform, a compressing rope extending around the platform, an apron at the rear end of the wagon in rear of said platform against which the butt ends of the sheaves rest during the formation of the shock, a vertically arranged frame supporting said apron and means for giving to said frame an inclination either forward or rearward for the purpose specified.

In testimony whereof, I have hereunto subscribed my name.

GEORGE MARSHALL.

Witnesses:
  S. S. SIDNER,
  W. J. COURTRIGHT.

Copies of this patent may be obtained for five cents each, by addressing the "Commissioner of Patents, Washington, D. C."